3,188,221
METHOD OF RETARDING THE SETTING TIME OF CEMENT
Osaku Matsuda, Takashi Toki, and Norihiro Kudo, all of Tokyo, Japan, assignors to Onoda Cement Company, Limited, Tokyo, Japan, a corporation of Japan
No Drawing. Filed May 25, 1962, Ser. No. 197,589
Claims priority, application Japan, May 30, 1961, 36/18,675
2 Claims. (Cl. 106—89)

This invention relates to a method of retarding the setting time of Portland cement and Portland type cement which contains blast furnace slag, silicious materials, and pozzolanic material by adding an aqueous solution of a retarding agent consisting of a water soluble silicofluoride and an acid dissolved in the water used for the preparation of fluid cement, mortar, and concrete.

An object of this invention is to provide a method of retarding the setting time of cement such as Portland cement and Portland type cement in order to give a easily controllable softness and a workable property to a cement paste, cement mortar and concrete, in addition to improved mechanical strength of them.

It is well known that starch, cellulose, sugar, phosphoric acid, organic acids, organic acid salts and silicofluorides are used as the retarding agents for retarding the setting time of cement. However, such retarding agents are not practically used, because, with the use of such materials as retarding agents, the slightest variation in their amounts, the mixing procedure or the temperature seriously retards the setting of cement, or affects the strength of cement, or causes the cement to set undesirably too fast—in any way because the action of such materials for the cement, when used as the retarding agents is too unstable and precarious for practical use.

This invention is intended to overcome the disadvantages inherent in the prior art method.

The inventors have long researched and found that a retarding agent consisted of at least one water soluble silicofluoride selected from the group consisting of magnesium silicofluoride ($MgSiF_6$), zinc silicofluoride ($ZnSiF_6$) lead silicofluoride ($PbSiF_6$), aluminium silicofluoride [$Al_2(SiF_6)_3$], hydrogen silicon fluoride ($H_2SiF_6$), ammonium silicofluoride [$(NH_4)_2SiF_6$] and a mixture thereof, and at least one acid selected from the group consisting or inorganic acids such as normal phosphoric acid and boric acid and organic acids such as acetic acid and succinic acid has a remarkably distinguished effect and a high working stability for retarding the setting time of cement. A mixture of such inorganic acids and such organic acids may be used.

The inventors have also found as the results of their researches that insoluble silicofluorides or hard soluble silicofluorides can hardly be expected to mix with cement practically in a homogeneous state and that the use of sodium silicofluoride alone or a mixture of sodium silcofluoride and the inorganic acids or the organic acids mentioned above is less effective in retarding the setting time of cement than the use of the water soluble silicofluoride alone, for example, magnesium silicofluoride ($MgSiF_6$) or the mixture of magnesium silicofluoride ($MgSiF_6$) and the above mentioned inorganic acids or the organic acids.

Still further inventors have found that the use of the insoluble silicofluorides or the hard soluble silicofluorides has such undesirable effect that, if they are increased in amount over a critical value, the setting time of cement is sharply shortened, so that the actions of such retarding agents become too unstable for practical use.

On the contrary, the retarding agent consisting of the above mentioned water soluble silicofluorides and the above mentioned acids used in this invention displays a remarkable distinguished effect for retarding the setting time of cement as compared with the effect of the water soluble silicofluoride alone, and the amount of the water soluble silicofluorides used may be reduced by adding such an acid. Said retarding agents used in this invention do not cause rapid setting to cement as they are not influenced by such factors as the amount, mixing procedure and temperature, and show a high working stability for retarding the setting time of cement. Also, the mortar or concrete prepared by practicing the method of this invention has larger strength after a period of 24 hours as compared with the mortar or concrete without the retarding agents of this invention and its strength further increases as time passes. The concrete prepared by practicing the method of this invention has an advantage that it gets smaller drying shrinkage.

Now, this invention will be illustrated by way of the following experimental results obtained by comparing the examples of this invention with the examples outside the scope of this invention in order to clarify the cooperative functions and effects resulting from the using of Portland cement and the water soluble silicofluorides together with the acid selected from the groups consisting of the inorganic acids and the organic acids. The cement used in said examples was normal Portland cement.

The setting tests were conducted in the manner defined under the Japanese Industrial Standards, JIS R5201 (1959) and the numerical data resulting from tests were illustrated in Tables 1 to 4. Tables 1 to 3 show the comparative examples and Table 4 shows the test results of the example of this invention. Percentages given are by weight.

TABLE 1

*Comparison of the setting time of cement being mixed with acid alone*

| Test No. | Ratio of acid to cement | | Setting time | | Interval between initial setting and final setting time in minutes |
|---|---|---|---|---|---|
| | Kind of acid | Percent | Initial setting time in minutes | Final setting time in minutes | |
| 1 | | 0 | 141 (100) | 215 (100) | 74 (100) |
| 2 | Phosphoric acid | 0.010 | 144 (102) | 215 (100) | 71 ( 96) |
| 3 | ___do___ | 0.025 | 138 ( 98) | 213 (99) | 75 (100) |
| 4 | ___do___ | 0.050 | 148 (105) | 222 (103) | 74 (100) |
| 5 | ___do___ | 0.100 | 159 (113) | 234 (109) | 75 (100) |
| 6 | ___do___ | 0.500 | 194 (138) | 316 (147) | 122 (165) |
| 7 | Acetic acid | 0.200 | 130 (92) | 189 (88) | 59 (80) |
| 8 | Succinic acid | 0.200 | 147 (104) | 217 (101) | 70 (94) |

As obvious from the Table 1, the acids do not display their retarding effects unless their amounts reach about 0.5%.

The figures in the parentheses represent index numbers of the cement containing acids as against the index number of the cement without them being calculated as 100.

TABLE 2

*Comparison of the setting time of cement mixed with silicofluoride alone*

| Test No. | Ratio of silicofluoride to cement | | Setting time | | Interval between initial setting and final setting time in minutes |
|---|---|---|---|---|---|
| | Kind of silicofluoride | Percent | Initial setting time in minutes | Final setting time in minutes | |
| 1 | | 0 | 141 (100) | 215 (100) | 74 (100) |
| 2 | $Na_2SiF_6$ | 0.025 | 175 (124) | 254 (118) | 79 (107) |
| 3 | $Na_2SiF_6$ | 0.05 | 209 (147) | 280 (130) | 71 (96) |
| 4 | $Na_2SiF_6$ | 0.10 | 212 (150) | 307 (143) | 95 (128) |
| 5 | $Na_2SiF_6$ | 0.80 | 296 (209) | 386 (179) | 90 (122) |
| 6 | $Na_2SiF_6$ | 1.00 | 171 (121) | 282 (131) | 111 (150) |
| 7 | $Na_2SiF_6$ | 2.00 | 25 (18) | 62 (29) | 37 (50) |
| 8 | $MgSiF_6$ | 0.025 | 204 (145) | 282 (131) | 78 (105) |
| 9 | $MgSiF_6$ | 0.05 | 239 (169) | 329 (133) | 90 (122) |
| 10 | $MgSiF_6$ | 0.10 | 255 (181) | 364 (169) | 109 (147) |
| 11 | $MgSiF_6$ | 0.50 | 403 (286) | 540 (251) | 137 (185) |
| 12 | $MgSiF_6$ | 1.00 | 504 (357) | <900 (<400) | |
| 13 | $MgSiF_6$ | 2.00 | >540 (>400) | <900 (<400) | |

In reference to the Table 2, the following facts are revealed.

(1) The water soluble magnesium silicofluoride $$(MgSiF_6)$$

displays a little better retarding effect than the water hard soluble sodium silicofluoride ($Na_2SiF_6$) while its addition rate is small.

(2) The retarding effect of the water hard soluble sodium silicofluoride ($Na_2SiF_6$) is rapidly reduced when its addition rate reaches above about 0.5%; but in the case of the water soluble magnesium silicofluoride ($MgSiF_6$) its retarding effect is not reduced even if its addition rate increases.

($MgSiF_6$), sodium silicofluoride ($Na_2SiF_6$), phosphoric acid ($H_3PO_4$), acetic acid, or succinic acid alone respectively or in the case of using the mixture of the water hard soluble sodium silicofluoride ($Na_2SiF_6$) and phosphoric acid; and it can also be understood that the water hard soluble sodium silicofluoride as an addition has such a disadvantage that it, if its addition rate is increased, accelerates the setting of the cement, instead of retarding the setting time of cement.

The retarding agents used in this invention are added to cement in an amount of from about 0.01% to about 1% by weight of cement but such values are not critically defined ones as the effects of such retarding agents are variable depending on the composition of and the temperature for working cement paste, mortar and concrete. The mixing rate of the acids used in this invention with respect to water soluble silico-fluorides is normally below 50% by weight. But this rate may be varied to control the setting time of the cement as it is possible to lengthen the interval between the initial setting time and the final

TABLE 3

*Comparison of the setting time of cement mixed with silicofluoride and phosphoric acid*

| Test No. | Ratio of silicofluoride plus phosphoric acid to cement | | | Setting time | | Interval between initial setting and final setting time in minutes |
|---|---|---|---|---|---|---|
| | $Na_2SiF_6$, percent | $MgSiF_6$, percent | $H_3PO_4$, percent | Initial setting time in minutes | Final setting time in minutes | |
| 1 | 0 | 0 | 0 | 141 (100) | 215 (100) | 74 (100) |
| 2 | 0.025 | 0 | 0.025 | 226 (160) | 308 (143) | 82 (111) |
| 3 | 0.025 | 0 | 0.10 | 207 (147) | 312 (145) | 105 (142) |
| 4 | 0.10 | 0 | 0.025 | 243 (172) | 329 (153) | 86 (116) |
| 5 | 0.10 | 0 | 0.10 | 264 (187) | 379 (176) | 115 (155) |
| 6 | 0 | 0.025 | 0.025 | 264 (187) | 359 (167) | 95 (128) |
| 7 | 0 | 0.10 | 0.01 | 282 (200) | 400 (186) | 118 (160) |

It is obvious from the Table 3 that the retarding effects of the cement mixed with 0.025% of magnesium silicofluoride and 0.025% of phosphoric acid ($MgSiF_6$ 0.025% plus $H_3PO_4$ 0.025%) and the cement mixed with 0.10% of sodium silicofluoride and 0.10% of phosphoric acid ($Na_2SiF_6$ 0.10% plus $H_3PO_4$ 0.10%) are approximate and also that the former's effect is approximate to such effect of the cement mixed with 0.10% of magnesium silicofluoride ($MgSiF_6$) alone as shown in the Table 2.

By comparing and studying the results shown in the above Tables 1 to 3, it can be understood that the cement added with the mixture of the water soluble magnesium silicofluoride ($MgSiF_6$) and phosphoric acid ($H_3PO_4$) displays remarkably distinguished retarding effect even in a much smaller amount of such addition than that in the case of using as additions magnesium silicofluoride setting time of the cement by increasing the amount of such acids.

The retarding agents of this invention may be used by simply dissolving them in the mixing water used for cement paste, mortar or concrete since they are water soluble and the operations such as mixing and handling may be followed in the same manner as conventionally practiced. And with the use of the retarding agents of this invention, there is no fear that the cement sets too rapidly even if their mixing rate with respect to the cement is increased.

The following Table 4 shows the cooperative functions and effects, achieved by this invention, by using the water soluble silicofluorides together with at least one acid selected from the group consisting of the inorganic acids and the organic acids. The tests were conducted in the manner defined by the Japanese Industrial Standards, JIS R 5201 (1959).

against the index number of the cement mortar without them being made as 100.

TABLE 4
*The setting tests of cement*

| Amounts of ingredients | | | | | | Setting time in minutes | | Interval between initial setting and final setting time in minutes |
|---|---|---|---|---|---|---|---|---|
| MgSiF$_6$ | ZnSiF$_6$ | Phosphoric acid | Boric acid | Acetic acid | Succinic acid | Initial set | Final set | |
| 0 | 0 | 0 | 0 | 0 | 0 | 141 (100) | 215 (100) | 74 (100) |
| 0.050 | 0 | 0 | 0 | 0 | 0 | 239 (169) | 329 (153) | 90 (122) |
| 0.050 | 0 | 0.010 | 0 | 0 | 0 | 263 (187) | 363 (163) | 100 (135) |
| 0.050 | 0 | 0.025 | 0 | 0 | 0 | 280 (199) | 418 (194) | 138 (186) |
| 0.100 | 0 | 0 | 0 | 0 | 0 | 255 (181) | 364 (169) | 109 (147) |
| 0.100 | 0 | 0.010 | 0 | 0 | 0 | 282 (200) | 400 (172) | 118 (180) |
| 0.075 | 0 | 0.025 | 0 | 0 | 0 | 323 (229) | 485 (219) | 162 (219) |
| 0.075 | 0 | 0 | 0.025 | 0 | 0 | 310 (220) | 452 (210) | 142 (195) |
| 0.075 | 0 | 0 | 0 | 0.025 | 0 | 293 (208) | 443 (206) | 150 (203) |
| 0.075 | 0 | 0 | 0 | 0 | 0.025 | 303 (215) | 454 (211) | 151 (204) |
| 0.500 | 0 | 0 | 0 | 0 | 0 | 403 (286) | 540 (251) | 137 (185) |
| 0.490 | 0 | 0.010 | 0 | 0 | 0 | 430 (305) | 625 (291) | 195 (263) |
| 0 | 0.100 | 0 | 0 | 0 | 0 | 264 (189) | 329 (153) | 65 (84) |
| 0 | 0.075 | 0.025 | 0 | 0 | 0 | 361 (256) | 448 (208) | 87 (118) |
| 0 | 0.075 | 0 | 0.025 | 0 | 0 | 340 (241) | 447 (208) | 107 (145) |
| 0 | 0.075 | 0 | 0 | 0.025 | 0 | 338 (240) | 439 (204) | 101 (137) |
| 0 | 0.075 | 0 | 0 | 0 | 0.025 | 351 (249) | 430 (200) | 79 (107) |

The figures in the parentheses represent index numbers of cement containing retarding agents as against the index number of the cement without them being calculated as 100. The following Table 5 shows the data in kg./cm.$^2$ resulted from the testing of the compressive strength of the cement mortars containing the retarding agents of this invention and of the cement mortars containing conventional retarding agents. The tests were conducted in the manner defined uder the Japanese Industrial Standards, JIS R 5201 (1959).

The following Table 6 shows the data in centimeter resulted from the testing of slump of the concrete containing the retarding agents of this invention and of the concrete containing no retarding agent. The tests were conducted in the manner defined under the Japanese Industrial Standards JIS A 1101 (1950).

In these tests, the test samples were prearranged by remixing the previous mixed concrete consisted of cement, aggregate and water shown in the Table 6 for one minute in the mixer prior to the testing and their slump was

TABLE 5
*The compressive strength of cement mortars (kg./cm.$^2$)*

| Amounts of ingredients (precent) | | | | | | Age (days) | | | |
|---|---|---|---|---|---|---|---|---|---|
| MgSiF$_6$ | ZnSiF$_6$ | Phosphoric acid | Boric acid | Acetic acid | Succinic acid | 1 | 3 | 7 | 28 |
| 0 | 0 | 0 | 0 | 0 | 0 | 44.0 (100) | 124 (100) | 206 (100) | 435 (100) |
| 0.100 | 0 | 0 | 0 | 0 | 0 | 47.4 (107) | 145 (117) | 233 (113) | 483 (111) |
| 0.075 | 0 | 0.025 | 0 | 0 | 0 | 47.5 (107) | 156 (126) | 261 (127) | 522 (120) |
| 0.075 | 0 | 0 | 0.025 | 0 | 0 | 46.2 (105) | 158 (127) | 260 (126) | 520 (120) |
| 0.075 | 0 | 0 | 0 | 0.025 | 0 | 44.7 (102) | 149 (120) | 255 (124) | 511 (117) |
| 0.075 | 0 | 0 | 0 | 0 | 0.025 | 45.9 (104) | 151 (122) | 247 (120) | 523 (120) |
| 0 | 0.100 | 0 | 0 | 0 | 0 | 46.6 (106) | 139 (112) | 226 (110) | 480 (110) |
| 0 | 0.075 | 0.025 | 0 | 0 | 0 | 47.0 (107) | 154 (124) | 270 (131) | 533 (123) |
| 0 | 0.075 | 0 | 0.025 | 0 | 0 | 46.1 (105) | 143 (115) | 264 (128) | 522 (120) |
| 0 | 0.075 | 0 | 0 | 0.025 | 0 | 44.4 (101) | 149 (113) | 248 (120) | 510 (117) |
| 0 | 0.075 | 0 | 0 | 0 | 0.025 | 45.5 (103) | 159 (128) | 251 (122) | 534 (123) |

It is obvious from the Table 5 that the compressive strength of the cement mortars containing the retarding agents of this invention stood unaffected—or rather positively strong—even by their addition.

The figures in the parentheses represent index numbers of cement mortars containing the retarding agents as observed respectively in zero hour, one hour, two hours and three hours.

TABLE 6
*The slump test of the concrete*

| Expected slump (cm.) | Composition | | | | Amount mixed (percent) | | Observed slump (cm.) | | | |
|---|---|---|---|---|---|---|---|---|---|---|
| | Cement (kg.) | Water (kg.) | Water/cement (percent) | Sand (percent) | MgSiF$_6$ | H$_3$PO$_4$ | 0 hr. | 1 hr. | 2 hrs. | 3 hrs. |
| 20 | 300 | 208 | 69.4 | 48 | 0 | 0 | 20.0 | 17.6 | 13.0 | -------- |
| | | | | | 0.09 | 0.01 | 19.6 | 19.2 | 17.3 | 14.0 |
| 15 | 300 | 180 | 60.0 | 41 | 0 | 0 | 15.5 | 9.4 | 5.0 | -------- |
| | | | | | 0.09 | 0.01 | 15.6 | 13.0 | 10.2 | 6.5 |
| 7.5 | 300 | 161 | 53.7 | 39 | 0 | 0 | 7.2 | 3.3 | 1.5 | -------- |
| | | | | | 0.09 | 0.01 | 7.4 | 6.1 | 4.2 | 3.0 |

It is understood from the Table 6 that the slump of the concrete containing the retarding agents of this invention is larger than the slump of the concrete not containing the retarding agents.

In the tests, it was also observed that the concrete not containing the retarding agents had adhered to the inside surface of the mixer in one hour, or two hours while the concrete containing the retarding agents of this invention had not shown such a phenomenon.

The following Table 7 shows the Proctor penetration resistance in p.s.i. unit of the concrete. The tests were conducted in the manner defined under ASTM: C403–57T. The test samples were prepared by wet-screening the concrete shown in the Table 6 with a 5-mm. mesh sieve.

TABLE 7

*The Proctor needle penetration resistance of the concrete (p.s.i.)*

| Expected slump (cm.) | Temperature (° C.) | MgSiF$_6$ (percent) | H$_3$PO$_4$ (percent) | Time for the penetration resistance reaching 500 p.s.i. | Time for the penetration resistance reaching 4,000 p.s.i. |
|---|---|---|---|---|---|
| 20 | 30 | 0 | 0 | 264 | 352 |
|  |  | 0.045 | 0.005 | 306 | 390 |
|  |  | 0.090 | 0.010 | 356 | 454 |
|  | 20 | 0 | 0 | 340 | 442 |
| 15 | 30 | 0 | 0 | 210 | 273 |
|  |  | 0.045 | 0.005 | 268 | 349 |
|  |  | 0.090 | 0.010 | 348 | 436 |
|  |  | 0.180 | 0.020 | 418 | 501 |
|  | 20 | 0 | 0 | 326 | 405 |
| 7.5 | 30 | 0 | 0 | 186 | 266 |
|  |  | 0.090 | 0.010 | 272 | 370 |
|  |  | 0.180 | 0.020 | 337 | 418 |
|  |  | 0.270 | 0.030 | 426 | 533 |
|  | 20 | 0 | 0 | 285 | 384 |

The 500 p.s.i. in the Table 7 is considered the critical resistance enough to give concrete revibrations and the 4000 p.s.i. is considered the resistance of the concrete at the beginning of hardening.

The following Table 8 shows the compressive strength in kg./cm.$^2$ of the concrete tested by the use of the test pieces of 15 cm. dia. and 30 cm. length. The cement was placed at a temperature of 30° C. and cured for two days at 30° C. and then further cured for one more day or twenty-six days under water.

TABLE 8

*The compressive strength of the concrete*

| Expected slump (cm.) | Amount mixed (percent) | | Compressive strength (kg./cm.$^2$) | |
|---|---|---|---|---|
|  | MgSiF$_6$ | H$_3$PO$_4$ | 3 days | 28 days |
| 20 | 0 | 0 | 101 (100) | 247 (100) |
|  | 0.0225 | 0.0025 | 104 (103) | 264 (107) |
|  | 0.0450 | 0.005 | 112 (111) | 272 (110) |
|  | 0.0900 | 0.010 | 122 (121) | 283 (115) |
| 15 | 0 | 0 | 135 (100) | 310 (100) |
|  | 0.090 | 0.010 | 158 (117) | 333 (107) |
|  | 0.180 | 0.020 | 163 (121) | 364 (114) |
| 7.5 | 0 | 0 | 186 (100) | 349 (100) |
|  | 0.090 | 0.010 | 201 (108) | 358 (103) |
|  | 0.180 | 0.020 | 203 (109) | 380 (109) |

It is obvious from the Table 8 that the anti-compression strength of the concrete containing the retarding agents of this invention stood unaffected—or rather positively strong—even by their addition.

The figures in the parentheses represent index numbers of concrete containing the retarding agents as against the index number of the concrete without them being made as 100.

What we claim is:

1. A method of retarding the setting time of a cement when said cement is admixed with water, said cement being selected from the group consisting of Portland cement and Portland type cement which contains blast furnace slag, silicious material and pozzolanic material, which comprises adding to said cement about 0.01% to about 1% by weight based on the weight of cement of a retardant consisting of magnesium silicofluoride (MgSiF$_6$)

and at least one acid selected from the group which consists of phosphoric acid, boric acid, acetic acid, succinic acid, and mixtures thereof, said acid being used in an amount of below 50% by weight based on the weight of said silicofluoride.

2. A method of retarding the setting time of a cement when said cement is admixed with water, said cement being selected from the group consisting of Portland cement and Portland type cement which contains blast furnace slag, silicious material and pozzolanic material, which comprises adding to said said cement about 0.01% to about 1% by weight based on the weight of cement of a retardant consisting of zinc silicofluoride (ZnSiF$_6$) and at least one acid selected from the group which consists of phosphoric acid, boric acid, acetic acid, succinic acid, and mixtures thereof, said acid being used in an amount of below 50% by weight based on the weight of said silicofluoride.

References Cited by the Examiner

UNITED STATES PATENTS

| 1,644,964 | 10/27 | Welch | 106—90 |
| 1,644,965 | 10/27 | Welch | 106—90 |
| 1,726,403 | 8/29 | Mathey. | |
| 1,732,737 | 10/29 | Wiggins et al. | 106—315 |
| 2,113,375 | 4/38 | Himsworth | 106—315 |
| 2,006,426 | 7/38 | Weiler | 106—92 |
| 2,211,368 | 8/40 | Dickens | 106—315 |
| 2,292,616 | 8/42 | Dailey | 106—315 |
| 3,087,825 | 4/63 | Meier-Grolman | 106—89 |

TOBIAS E. LEVOW, *Primary Examiner.*

JOSEPH REBOLD, *Examiner.*